US012567194B2

(12) United States Patent
Lively et al.

(10) Patent No.: US 12,567,194 B2
(45) Date of Patent: Mar. 3, 2026

(54) METHOD AND SYSTEM FOR DISTRIBUTED RENDERING FOR SIMULATION

(71) Applicant: Unity Technologies ApS, Copenhagen (DK)

(72) Inventors: Steven David Lively, Wylie, TX (US); Justin A. Graham, Lafayette, CA (US); Priyeshkumar Wani, San Francisco, CA (US); Travis Paul Dorschel, Sammamish, WA (US); Viraf Zack, Foster City, CA (US); Zoe Bare, Austin, TX (US)

(73) Assignee: Unity Technologies ApS, Copenhagen (DK)

( * ) Notice: Subject to any disclaimer, the term of this patent is extended or adjusted under 35 U.S.C. 154(b) by 178 days.

(21) Appl. No.: 18/127,601

(22) Filed: Mar. 28, 2023

(65) Prior Publication Data

US 2023/0306671 A1 Sep. 28, 2023

Related U.S. Application Data

(60) Provisional application No. 63/324,539, filed on Mar. 28, 2022.

(51) Int. Cl.
*G06T 15/00* (2011.01)
(52) U.S. Cl.
CPC .................................. *G06T 15/005* (2013.01)

(58) Field of Classification Search
CPC ....... G06T 11/005; G06T 15/20; G06T 17/20; G06T 15/005; G06F 9/5033; A63F 13/352; A63F 13/355
See application file for complete search history.

(56) References Cited

U.S. PATENT DOCUMENTS

| | | | | |
|---|---|---|---|---|
| 2020/0005523 A1* | 1/2020 | Brebner | ................ | H04W 4/021 |
| 2020/0151846 A1* | 5/2020 | Yu | ............................ | G06T 17/00 |
| 2020/0209392 A1* | 7/2020 | Sadhu | ..................... | G06T 7/521 |
| 2022/0237336 A1* | 7/2022 | Zhao | ........................ | G06N 3/08 |

* cited by examiner

*Primary Examiner* — Michelle Chin
(74) *Attorney, Agent, or Firm* — Schwegman Lundberg & Woessner, P.A.

(57) ABSTRACT

A method of rendering a scene in a three-dimensional environment using a plurality of metaframes is disclosed. Data from digital objects within a three-dimensional (3D) environment is loaded. Motion for the digital objects is determined. The determining of the motion includes applying simulation or physics logic to the data. A plurality of metaframes is generated based on a plurality of scene graphs captured at a plurality of points in time. Each of the metaframes includes data describing position, scale, or rotation of the digital objects within the 3D environment at a point in time of the plurality of points of time. The plurality of metaframes is organized into a queue of metaframes. The plurality of metaframes is distributed to one or more rendering nodes in response to dequeuing of the metaframes from the queue by the one or more rendering nodes.

20 Claims, 6 Drawing Sheets

300

400

METHOD AND SYSTEM FOR DISTRIBUTED RENDERING FOR SIMULATION

CROSS-REFERENCE TO RELATED APPLICATIONS

This application claims the benefit of U.S. Provisional Application No. 63/324,539, filed Mar. 28, 2022, which is incorporated by reference herein in its entirety.

TECHNICAL FIELD

The subject matter disclosed herein generally relates to the technical field of computer graphics and rendering.

BACKGROUND

Large-scale computer simulations with many sensors, many agents, or complex frame elements frequently exceed the performance capabilities of a single graphics rendering instance. At scale, users require generation of many images in a very short period of time; for example, simulating multiple agents, each with multiple sensors (cameras), in a shared environment. Simulations can get extremely complex to a point where the bottleneck in the application can throttle the performance and prevent one from utilizing available computing resources.

BRIEF DESCRIPTION OF THE DRAWINGS

Features and advantages of example embodiments of the present disclosure will become apparent from the following detailed description, taken in combination with the appended drawings, in which.

DETAILED DESCRIPTION

Figure 1:
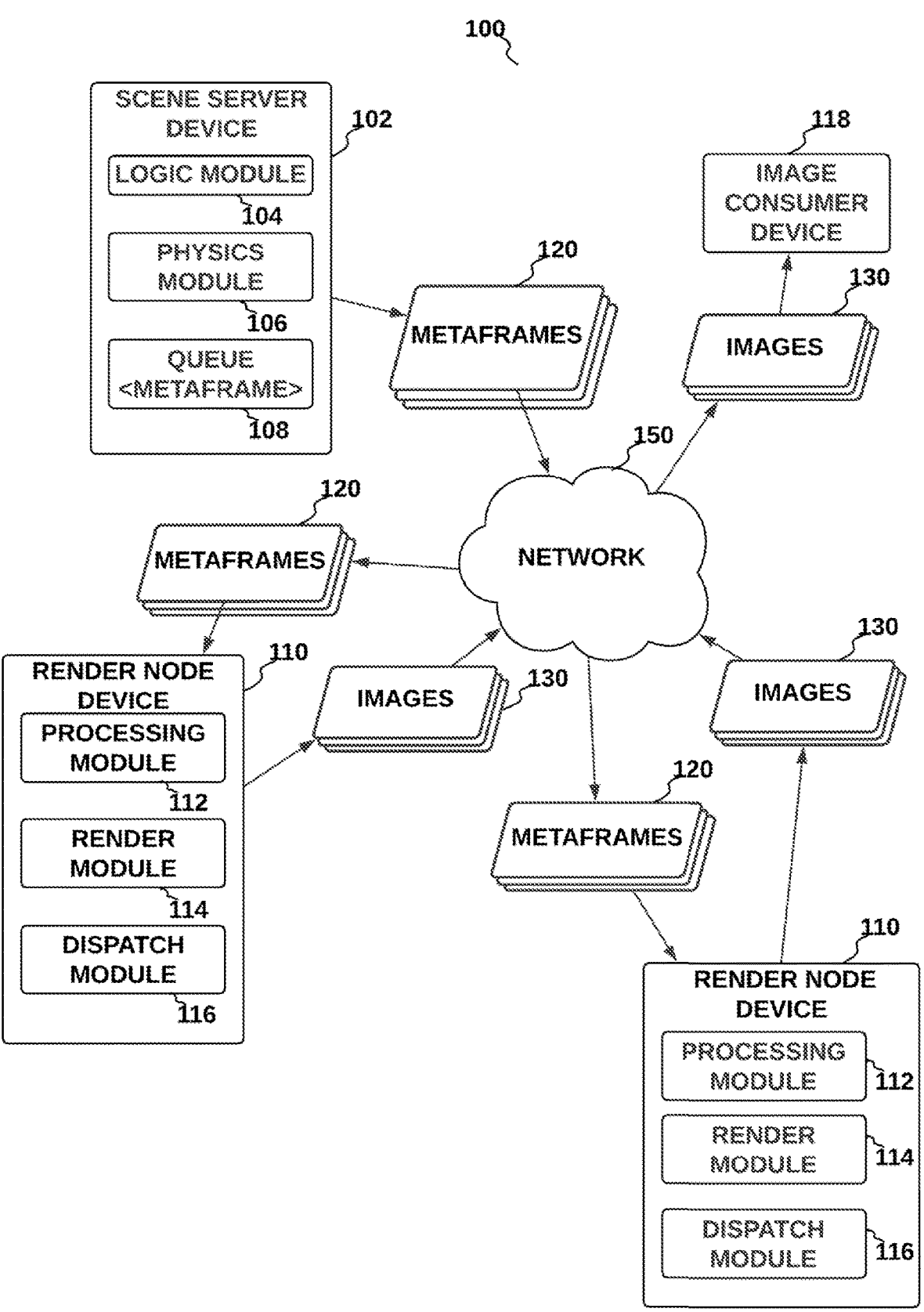
FIG. 1 is a schematic illustrating a dynamic rendering system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the disclosed subject matter. It will be evident, however, to those skilled in the art, that various embodiments of the disclosed subject matter may be practiced without these specific details.

A method of rendering a scene in a three-dimensional environment using a plurality of metaframes is disclosed. Data from digital objects within a three-dimensional (3D) environment is loaded. Motion for the digital objects is determined. The determining of the motion includes applying simulation or physics logic to the data. A plurality of metaframes is generated based on a plurality of scene graphs captured at a plurality of points in time. Each of the metaframes includes data describing position, scale, or rotation of the digital objects within the 3D environment at a point in time of the plurality of points of time. The plurality of metaframes is organized into a queue of metaframes. The plurality of metaframes is distributed to a plurality of rendering nodes in response to dequeuing of the metaframes from the queue by the plurality of rendering nodes.

The distributed rendering systems and methods described herein include one or more components or operations that are non-routine or unconventional individually or when combined with one or more additional components or operations, because, for example, they provide a number of valuable benefits for rendering images (e.g., within large scale simulations). The distributed rendering methods and systems described herein may accelerate image production by allowing multiple computer application processes to render images of a shared scene (e.g., a 3D scene) in parallel, on a single machine or multiple physical or virtual machines, with synchronized scene state. This may benefit large-scale simulation, and in addition may benefit any scenario where high rendering throughput is required. For example, in a robotics simulation, the scene may contain multiple robots, each equipped with multiple sensors. Existing rendering methods and systems within a single computer application process may not be able to render all sensors for all robots within a time allotted to a single frame.

In accordance with an embodiment, the distributed rendering systems and methods described herein may include separating a rendering task into two processes: a first process which performs physics, animation, (or other simulation related tasks) and maintains a scene graph, and a second process which only performs rendering. In accordance with an embodiment, the first process is performed by a scene server device (described below) and the second process is performed by a render node device (described below). A plurality of render node processes and devices may share the workload of rendering.

Example embodiments may be in contrast to other systems and methods, such as other systems and methods that use two threads within a single process, wherein one thread performs CPU tasks such as physics, networking, IO, maintaining a scene graph, and/or populating a queue of abstract drawing commands, and wherein a second "render" thread in the same process reads from the populated queue, converts abstract commands into concrete graphics API calls, and/or executes those commands on a graphics device (e.g., via a graphics driver and/or chosen graphics API).

Turning now to the drawings, systems and methods, including non-routine or unconventional components or operations, or combinations of such components or operations, for dynamic rendering in accordance with embodiments of the disclosure are illustrated. In example embodiments, FIG. 1 is a diagram of an example dynamic rendering system 100 and associated devices configured to provide dynamic rendering system functionality. In the example embodiment, the dynamic rendering system 100 includes a scene server device 102, at least one render node device 110, and/or an image consumer device 118 coupled in networked communication via a network 150 (e.g., a cellular network, a Wi-Fi network, the Internet, and so forth). In some embodiments, the scene server device 102 is a mobile computing device, such as a smartphone or a tablet computer. In other embodiments, the scene server device 102 is a computing device such as a desktop computer. In accordance with an embodiment, the scene server device 102 be implemented as a software module within a physical device. In some embodiments, the render node device 110 is a mobile computing device, such as a smartphone or a tablet computer. In other embodiments, the render node device 110 is a computing device such as a desktop computer. In some embodiments, the image consumer device 118 is a mobile computing device, such as a smartphone or a tablet computer. In other embodiments, the image consumer device 118 is a computing device such as a desktop computer. In accordance with an embodiment, the image consumer device 118 may include a display device for displaying received images. In accordance with another embodiment, the image consumer device 118 may include an image processing device for analyzing received images. Although FIG. 1 shows only two render node devices 110, it should be understood that the system 100 may include any number of render node devices 110. In accordance with an embodiment, a render node device 110 may be implemented as a software module within a physical device. In addition, although FIG. 1 shows only one image consumer device 118, it should be understood that the system 100 may include any number of image consumer devices 118. For example, there may be one image consumer device for each render node device 110.

Figure 2:
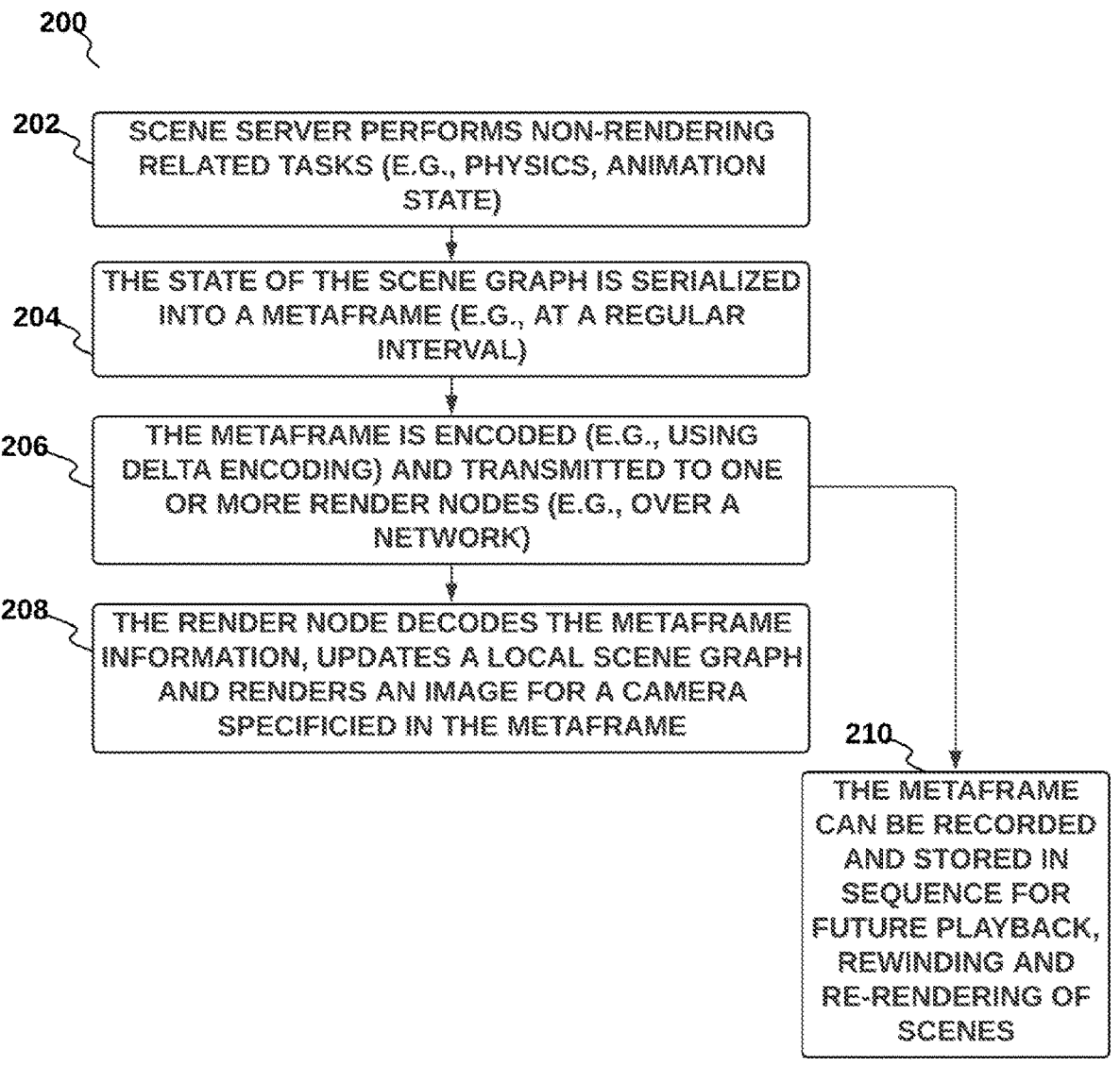
FIG. 2 is a schematic illustrating a method for dynamic rendering using a dynamic rendering system, in accordance with one embodiment.

In accordance with an embodiment, and as shown in FIG. 1 (e.g., and further described with respect to the method 200 shown in FIG. 2), a scene server device 102 may include a logic module 104 (e.g., game logic module, simulation logic module, or the like), a physics module 106 (e.g., a physics engine), and/or a queue 108. The queue 108 may be a queue of metaframes 120 (described in detail below). The metaframes 120 may be received via the network 150 by a render node device 110. A render node device 110 may include a processing module 112, rendering module 114 which performs rendering of the metaframes 120 (e.g., as described below), a dispatch module 116 for dispatching rendered images 130 to an image consumer device 118. In accordance with an embodiment, the images 130 generated by a render node device 110 are consumed by an image consumer device 118 (e.g., displayed, analyzed, stored, etc.). In accordance with an embodiment, the logic module 104, physics module 106, and/or the queue 108 may be implemented within a scene server module 543 (e.g., shown in FIG. 5). In accordance with an embodiment, the processing module 112, the render module 114, and/or the dispatch module 116 may be implemented within a render node module 545 (e.g., shown in FIG. 5)

In accordance with an embodiment, and shown in FIG. 2 is a method for dynamic rendering. In accordance with an embodiment, and shown in FIG. 2 is a flowchart of a method 200 for dynamic rendering. The method 200 may be used in conjunction with the dynamic rendering system 100 as described with respect to FIG. 1. In various embodiments, some of the method elements shown may be performed concurrently, in a different order than shown, or may be omitted. In accordance with an embodiment, at operation 202 of the method 200, a scene server device 102 performs non-rendering related tasks; e.g., including physics calculations, determining animation state, and the like. The scene server device 102 maintains a scene graph, executes user scripts, and/or performs one or more tasks not directly related to rendering. In accordance with an embodiment, a state of the scene graph is serialized into a metaframe 120 (e.g., the metaframe may store a state of the scene graph). The scene graph may include data describing objects in a scene including object positions (e.g., object transform positions), scale of objects, rotation and orientation of objects, and other serializable properties. The scene graph may be serialized at regular intervals to a queue of metaframes 120. At operation 204 of the method 200, a metaframe 120 may be encoded (e.g., using delta encoding) by the scene serve device 102. In accordance with an embodiment, at operation 206, the metaframe 120 may be encoded (e.g., using delta encoding) and transmitted to one or more render nodes 110 (e.g., over the network 150). In accordance with an embodiment, the delta encoding may include data describing differences (e.g., changes) associated with objects in the scene; including differences in the following: object positions (e.g., object transform positions), scale of objects, rotation and orientation of objects, and other serializable properties. In accordance with an embodiment, at operation 208 of the method 200, a render node 110 decodes the metaframe information, updates a local scene graph, and/or renders an image for a camera specified in the metaframe. As part of operation 208, metaframes may be dequeued over the network 150 by one or more separate render node devices 110, or one or more render node processes on a render node device 110. The render node 110 may do one or more of the following with the generated rendered image: store it (e.g., record it on the render node device 110, within a database, or on another storage device), transmit it (e.g., over the network to an image consumer device 118), and/or display the image (e.g., on a display device).

In accordance with an embodiment, at operation 210 of the method 200, the serialized metaframes 120 may be recorded (e.g., stored) in sequence and/or replayed in order to provide fully-deterministic/repeatable simulation. In addition, recorded metaframes may be used for future playback, rewinding and/or re-rendering (e.g., with a different camera position and/or orientation) of simulations and/or scenarios. Serializing and saving the metaframe sequences of data 120 allows for recording, playback and/or inspecting of a 3D state of a simulation. The metaframe sequences 120 can be reviewed in a similar manner to video, moving or "scrubbing" through time, and/or can be viewed from any angle and lighting, while environmental changes can be made. A simulation contained within metaframes 120 may also be viewed using VR/AR/XR devices, collaborated on with a plurality of users, and/or viewed while moving forward or backward in time in the simulation. Encoding the simulation state to metaframe sequences 120 allows replay, review and/or inspection of the simulation results in a deterministic manner. This feature of distributed rendering can be useful in many fields for diagnosis, forensic analysis, failure analysis, experimentation, debugging and/or training. In accordance with an embodiment, the recorded metaframes 120 can be accessed at any point in time within simulation time (e.g., similar to video formats) and can be used to review, debug, diagnose and/or evaluate simulations and scenarios.

In accordance with an embodiment, the physics and logic (e.g., user script logic) performed in operation 202 runs on a single instance while distributing rendering tasks across multiple processes (e.g., as in operation 206 and 208), thereby guaranteeing deterministic output. The dynamic rendering system 100 can guarantee that all cameras within an environment see a consistent scene state at any given frame number.

In accordance with an embodiment, a metaframe 120 encodes frame information from the scene server device 102 to be decoded, processed and/or rendered by the render node device 110. The metaframes 120 may be a sequence over time, wherein each has time information (e.g., a timecode). A metaframe includes data describing an environment, or part thereof, including one or more digital objects (e.g., 3D objects), environment conditions (e.g., metadata on lighting, materials, and the like), and scene graphs captured at a time. In accordance with an embodiment, a metaframe may include data that describes position, scale, rotation of digital objects within an environment. In accordance with an embodiment, a metaframe may include data describing one or more camera selections for a render node device 110 (e.g., for a camera affinity mode and/or a lock-step mode as described below). In accordance with some embodiments, the metaframe 120 can be efficiently encoded using Delta Encoding, wherein only data that is changing between a first and second metaframe is encoded and stored in the second metaframe. This efficiently reduces an amount of data required to stream 3D content as delta encoded frames will only contain moving or dynamic objects or data between metaframes. In video encoding this is referred to as I-frames and P-frames for Intra-frame coding. An efficient implementation of the dynamic rendering system 100 may use delta encoding to store full metaframes ("I-frame") and delta metaframes ("P-frame") using intra-frame encoding techniques for optimal compression and/or reduced size and/or bandwidth of the metaframe stream.

In accordance with an embodiment, each render node device 110 may maintain a copy of the scene (e.g., 3D scene state data) and/or all or a subset of assets required to generate an image within the scene (e.g., via a virtual camera therein). Based on a render node device 110 receiving a metaframe 120, it may update its local scene graph to match that sent from the scene server device 102. It may then render an image for a camera specified in the metaframe. The resulting images may then be displayed, stored, or transmitted to another process.

In accordance with an embodiment, one scene server device 102 may communicate with one or more render nodes, on one or more physical or virtual machines over the network 150. In many cases, significant performance scaling may be achieved by running a plurality of render nodes on a single machine, or plurality of render nodes on a plurality of machines.

Figure 3:
FIG. 3 is a schematic illustrating a script lifecycle for a player loop in a scene server device within a distributed rendering system, in accordance with one embodiment.
Figure 3:
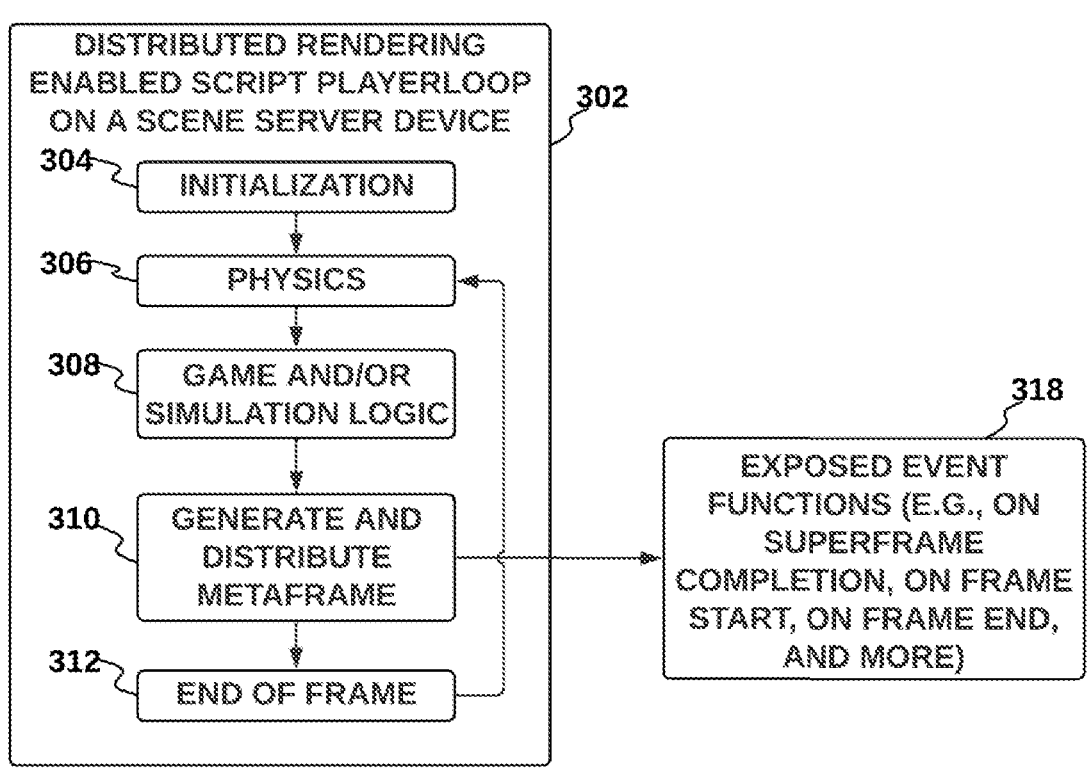

In accordance with an embodiment, FIG. 3 shows a flowchart for a method 300 that includes a playerloop 302 which may be executed on a scene server device 102 (e.g., using the method 200 described with respect to FIG. 2). In various embodiments, some of the method elements shown may be performed concurrently, in a different order than shown, or may be omitted. In accordance with an embodiment, the playerloop 302 may include an initialization operation 304 that may include loading of data from digital objects within a 3D environment (e.g., a 3D scene) into a memory. The playerloop 302 may include an operation 306 that includes a calculation of physics 306 within the 3D environment including a determination of animation for digital objects therein (e.g., using a physics engine). This may include a determination of motion for the digital objects, and/or a determination of collisions, and/or a determination of character posing, and more. In accordance with an embodiment, at operation 308, some game and/or simulation logic is applied to the environment and/or the digital objects therein. In accordance with an embodiment, at operation 310 of the method 300, a rendering of the environment may be controlled (e.g., managed). The controlling may be performed by a distributed rendering shim. The controlling may include a generation of metaframes 120 and organizing into a queue of metaframes 108. The controlling may also include a distribution of the metaframes to one or more render nodes 110. In accordance with an embodiment, operation 310 may include an execution of event functions 318 related to the distributed rendering. In accordance with an embodiment, at operation 312 of the method 300, there may be end of frame operations which occur at the end of a frame. The end of frame operations 312 may include pausing of a simulation and/or rendering, or decommissioning of digital objects (e.g., deleting data within a memory). The end of frame operations may also include a looping back to another operation in the method 300 for an update for another metaframe, for example, back to the physics operations 306.

Figure 4:
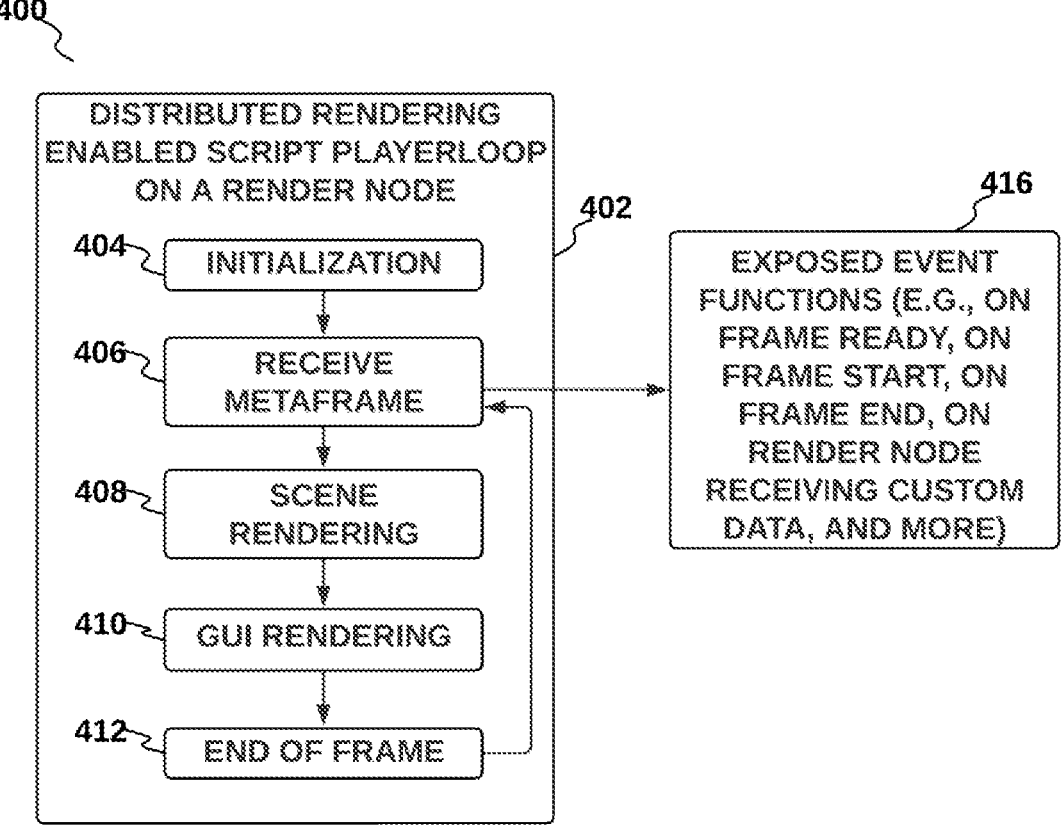
FIG. 4 is a schematic illustrating a script lifecycle for a player loop in a render node device within a distributed rendering system, in accordance with one embodiment.

In accordance with an embodiment, FIG. 4 shows a flowchart for a method 400 that includes a playerloop 402 which may be executed on a render node device 110 (e.g., using the method 200 described with respect to FIG. 2). In various embodiments, some of the method elements shown may be performed concurrently, in a different order than shown, or may be omitted. In accordance with an embodiment, the playerloop 402 may include an initialization operation 404 that may include loading of data into a memory. In accordance with an embodiment, at operation 406 of the method 400, the render node device 110 may receive one or more metaframes 120 (e.g., from a scene server 102). In accordance with an embodiment, operation 406 may include an execution of event functions 416 related to the distributed rendering. At operation 408 the render node device 110 may use data within the received metaframe to render a scene (e.g., a portion of the environment via a camera frustum). In accordance with an embodiment, at operation 410 of the method 400, there may be an additional graphical user interface (GUI) rendering. In accordance with an embodiment, at operation 412 of the method 400, there may be end of frame operations which occur at the end of a frame. The end of frame operations 412 may include pausing of a rendering, or decommissioning of digital objects (e.g., deleting data within a memory). The end of frame operations may also include a looping back to another operation in the method 400 for a rendering of another metaframe.

In accordance with an embodiment, the distributed rendering system 100 may operate in an asynchronous mode wherein the scene server devices 102 and the render rode devices 110 function independently. During an asynchronous operation a scene server device 102 may be configured to generate metaframe data as fast as possible, and wherein render node devices are configured to consume the generated metaframe data queued up by the scene sever device 102 (e.g., in a round robin fashion). In an asynchronous mode, there may be no dedicated camera assigned to a render node device. In asynchronous mode, the distributed rendering system 100 configured to finish generating a number of frames as fast as possible (e.g., in a deterministic fashion).

In accordance with an embodiment, it may be required for a render node device 110 to be on a specific apparatus to render a specific camera within the scene. The dynamic rendering system 100 may include camera affinity (e.g., within a camera affinity mode) wherein a render node device 110 may be dedicated to a specific camera. This is useful when driving a display array where each physical output device is tied to a camera (e.g., a virtual camera within a 3D digital environment), or when a specific camera requires hardware or software features that are not available on other machines. For example, if a simulation has a sensor that requires DirectX raytracing, the dynamic rendering system 100 may assign that camera to a Windows machine with a capable GPU. In accordance with an embodiment, a camera affinity mode may be similar to the asynchronous mode except that each render node is assigned a camera. Accordingly, based on 3D scene including cameras, the distributed rendering system 100 operating in a camera affinity mode would be configured to spawn 5 render node devices 110 in order to consume data produced a scene server device 102.

In accordance with an embodiment, the distributed rendering system. 100 may operate in a lock-step mode wherein the scene server is configured to execute a full player loop (e.g., as described in FIG. 3) thereby allowing user interaction, audio, and with all or a subset of other systems removed in order to run the simulation faster than real-time. In lock-step mode, one camera may be allotted to the scene server device 102 for rendering. For example, in lock-step mode, the distributed rendering system 100 may be configured to have a lightweight camera rendering on a master scene server device 102 and whereby one or more render node devices 110 are configured to render additional cameras (or more computationally complex rendering in order to remove it from the scene server device 102). In lock-step mode the one or more render node devices 110 may be configured to halt progression of a playerloop (e.g., a playerloop as described in FIG. 4) until it receives metaframe data from the scene server device 102. This way, if the scene server device 102 and a render node device 110 start at the same time, the player loop progression on each will be in sync wherein simulation time passage will be the same for the scene server device 102 and the render node device 110. Accordingly, animation updates (e.g., within the physics update 306) are propagated to all render node devices 110 in a lock-step fashion. This lock-step mode is beneficial for all real-time use cases such as with self-driving cars wherein all cameras on a vehicle need to see an environment (e.g., a road) at exactly the same time. In accordance with an embodiment, in lock-step mode operation, user interaction is possible with the distributed rendering system 100 and method 200, for example, enabling human in the loop type simulations.

In accordance with an embodiment, the lock-step mode may be configured to include external signaling conditions that includes a receiving of external signals for controlling execution of a player loop. The external signals may control a player loop within the scene server device 102 or a render node device 110. In either case the lock-step mode will guarantee synchronization at frame level. The inclusion of external signaling conditions is beneficial for co-simulations wherein a second simulation within an external process may drive a first simulation execution (e.g., via the signaling conditions) within the distributed rendering system 100. In accordance with an embodiment, a simulation condition may be updated on a background thread (e.g., on either the scene server device 102 or a render node device 110) as a main thread will block until the condition is met.

The architecture also enables fully-deterministic simulation replay using metaframes. By recording the scene graph over the course of the simulation, part or all of the experiment may be "replayed" by re-dispatching metaframes to render nodes. As metaframes store the full 3D scene they can also be replayed and viewed or re-rendered from other viewpoints using other environmental or lighting conditions.

This allows for future review and inspection of a simulation metaframe stream which can be useful for further scenario evaluation, forensic analysis, debugging and experimentation using various controls and viewpoints.

Example: In Automotive simulation, it is very common to have a plurality of simulated camera-based sensors attached to a self-driving car. Rendering each of these sensors in a single process can create a rendering bottleneck and increase the frame render time. With the Distributed Rendering method 200 shown in FIG. 2, the rendering workload of these sensors may be distributed to other processes on the same or multiple virtual or physical machines and achieve the same results with higher throughput.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
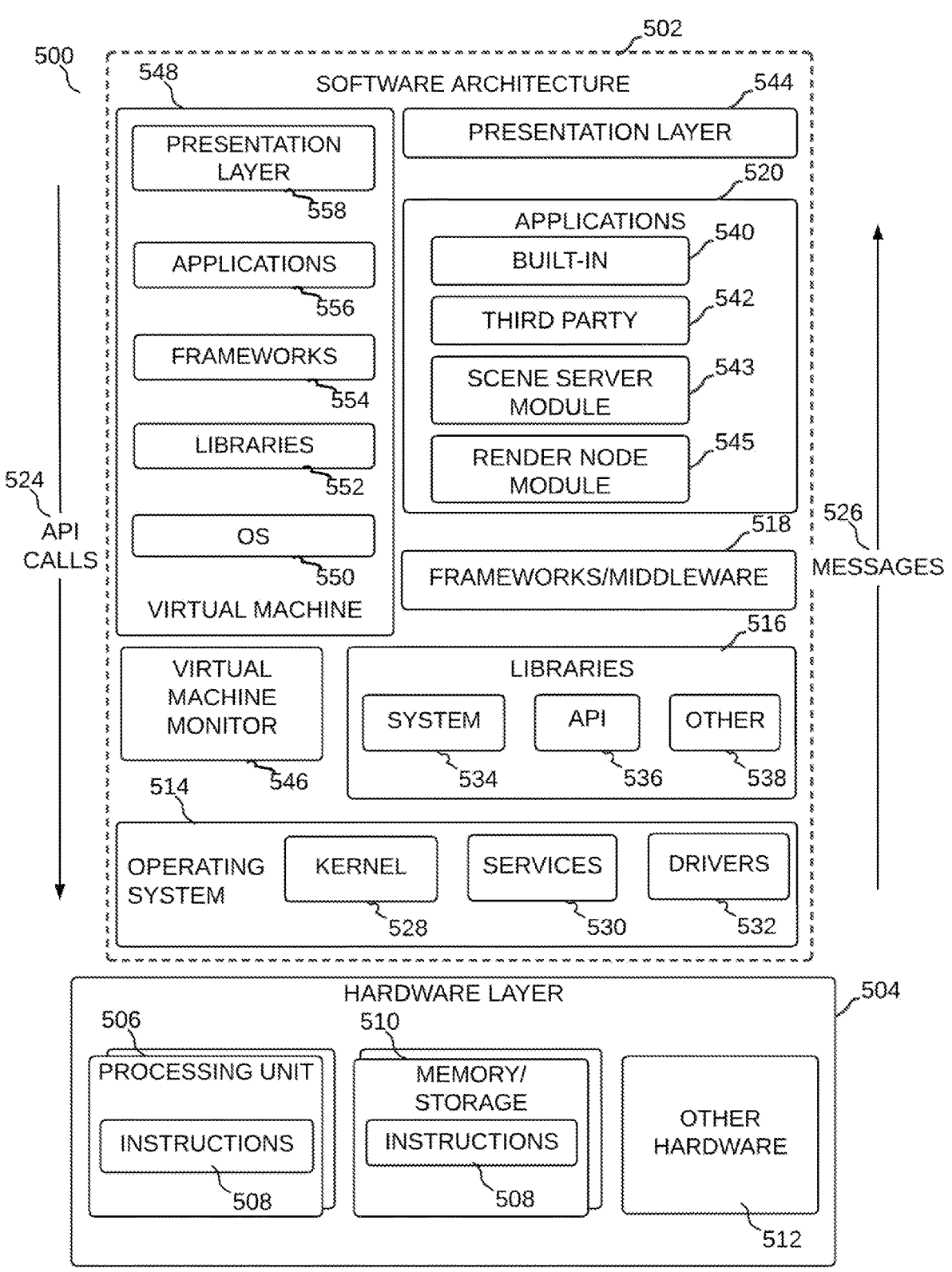
FIG. 5 is a block diagram illustrating an example software architecture, which may be used in conjunction with various hardware architectures described herein.

FIG. 5 is a block diagram 500 illustrating an example software architecture 502, which may be used in conjunction with various hardware architectures herein described to provide a gaming engine (e.g., including a logic module 104 and physics module 106) and/or components of the digital rendering system 100. FIG. 5 is a non-limiting example of a software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 having associated executable instructions 508. The executable instructions 508 represent the executable instructions of the software architecture 502, including implementation of the methods, modules and so forth described herein. The hardware layer 504 also includes memory/storage 510, which also includes the executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks or middleware 518, applications 520 and a presentation layer 544. Operationally, the applications 520 and/or other components within the layers may invoke application programming interface (API) calls 524 through the software stack and receive a response as messages 526. The layers illustrated are representative in nature and not all software architectures have all layers. For example, some mobile or special purpose operating systems may not provide the frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 616 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) provide a higher-level common infrastructure that may be used by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 542 may invoke the API calls 524 provided by the mobile operating system such as operating system 514 to facilitate functionality described herein. Additional third-party applications may include a scene server module 543 which may include one or more of the logic module 104, physics module 106, and/or the queue 108 as described herein (e.g., with respect to FIG. 1). Additional third-party applications may also include a render node module 545 which may include or more of the processing module 112, the render module 114, and/or the dispatch module 116 as described herein (e.g., with respect to FIG. 1).

The applications 520 may use built-in operating system functions (e.g., kernel 528, services 530 and/or drivers 532), libraries 516, or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures use virtual machines. In the example of FIG. 5, this is illustrated by a virtual machine 548. The virtual machine 548 creates a software environment where applications/modules can execute as if they were executing on a hardware machine (such as the machine 600 of FIG. 6, for example). The virtual machine 548 is hosted by a host operating system (e.g., operating system 514) and typically, although not always, has a virtual machine monitor 546, which manages the operation of the virtual machine 548 as well as the interface with the host operating system (i.e., operating system 514). A software architecture executes within the virtual machine 548 such as an operating system (OS) 550, libraries 552, frameworks 554, applications 556, and/or a presentation layer 558. These layers of software architecture executing within the virtual machine 548 can be the same as corresponding layers previously described or may be different.

Figure 6:
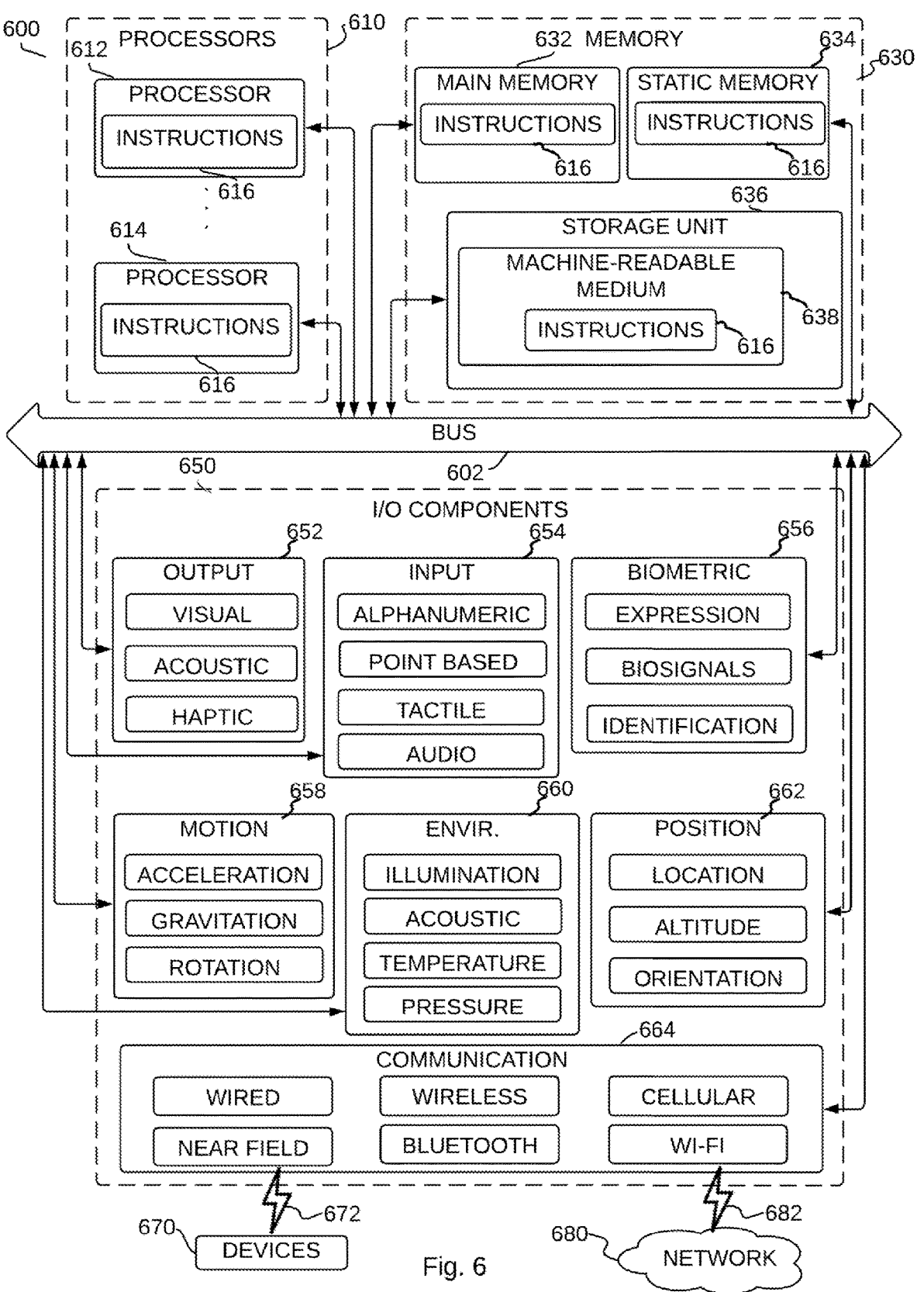
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 600, according to some example embodiments, configured to read instructions from a machine-readable medium (e.g., a machine-readable storage medium) and perform any one or more of the methodologies discussed herein. In some embodiments, the machine 600 is similar to the scene server device 102 and the render node device 104. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. As such, the instructions 616 may be used to implement modules or components described herein. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that may execute the instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 may include a memory, such as a main memory 632, a static memory 634, or other memory, and a storage unit 636, both accessible to the processors 610 such as via the bus 602. The storage unit 636 and memory 632, 634 store the instructions 616 embodying any one or more of the methodologies or functions described herein. The instructions 616 may also reside, completely or partially, within the memory 632, 634, within the storage unit 636, within at least one of the processors 610 (e.g., within the processor's cache memory), or any suitable combination thereof, during execution thereof by the machine 600. Accordingly, the memory 632, 634, the storage unit 636, and the memory of processors 610 are examples of machine-readable media 638.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 650 may include a wide variety of components to receive input, provide output, produce output, transmit information, exchange information, capture measurements, and so on. The specific input/output (I/O) components 650 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 650 may include many other components that are not shown in FIG. 6. The input/output (I/O) components 650 are grouped according to functionality merely for simplifying the following discussion and the grouping is in no way limiting. In various example embodiments, the input/output (I/O) components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 662, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
   one or more computer processors;
   one or more computer memories;
   a set of instructions stored in the one or more computer memories, the set of instructions configuring the one or more computer processors to perform operations, the operations comprising:
   loading data from digital objects within a three-dimensional (3D) environment;
   determining motion for the digital objects, the determining of the motion including applying simulation or physics logic to the data;
   generating a plurality of metaframes based on a plurality of scene graphs, each of the plurality of metaframes including the digital objects captured at a plurality of points in time, each of the plurality of metaframes including data describing position, scale, or rotation of the digital objects within the 3D environment at a point in time of the plurality of points of time;
   organizing the plurality of metaframes into a queue of metaframes; and distributing the plurality of metaframes to one or more rendering nodes in response to dequeuing of the metaframes from the queue by the one or more rendering nodes.

2. The system of claim 1, wherein the generating is executed by a first process and each of the one or more rendering nodes is executed by an additional process and each of the one or more rendering nodes is configured to transmit a generated rendered image to an image consumer device or display the generated rendered image on a display device.

3. The system of claim 1, wherein the generating of the plurality of metaframes is performed in an asynchronous mode with respect to the one or more rendering nodes.

4. The system of claim 1, wherein the distributing of the plurality of metaframes is performed in a camera affinity node in which each node of the one or more rendering nodes is associated with a camera and the dequeuing of each metaframe by each of the one or more rendering nodes is based on camera affinity data included in the metaframe.

5. The system of claim 1, wherein the distributing of the plurality of metaframes is performed in a lock-step mode in which each of the one or more rendering nodes is in synch with a server.

6. The system of claim 5, wherein external signals are sent to the server or the one or more rendering nodes to control execution of player loops within the server or the one or more rendering nodes.

7. The system of claim 1, wherein a state of the scene graph is serialized into the plurality of metaframes at configurable intervals.

8. A non-transitory computer-readable storage medium storing a set of instructions that, when executed by one or more computer processors, cause the one or more computer processors to perform operations, the operations comprising:

loading data from digital objects within a three-dimensional (3D) environment;

determining motion for the digital objects, the determining of the motion including applying simulation or physics logic to the data;

generating a plurality of metaframes based on a plurality of scene graphs, each of the plurality of metaframes including the digital objects captured at a plurality of points in time, each of the plurality of metaframes including data describing position, scale, or rotation of the digital objects within the 3D environment at a point in time of the plurality of points of time;

organizing the plurality of metaframes into a queue of metaframes; and distributing the plurality of metaframes to one or more rendering nodes in response to dequeuing of the metaframes from the queue by the one or more rendering nodes.

9. The non-transitory computer-readable storage medium of claim 8, wherein the generating is executed by a first process and each of the one or more rendering nodes is executed by an additional process and each of the one or more rendering nodes is configured to transmit a generated rendered image to an image consumer device or display the generated rendered image on a display device.

10. The non-transitory computer-readable storage medium of claim 8, wherein the generating of the plurality of metaframes is performed in an asynchronous mode with respect to the one or more rendering nodes.

11. The non-transitory computer-readable storage medium of claim 8, wherein the distributing of the plurality of metaframes is performed in a camera affinity node in which each node of the one or more rendering nodes is associated with a camera and the dequeuing of each metaframe by each of the one or more rendering nodes is based on camera affinity data included in the metaframe.

12. The non-transitory computer-readable storage medium of claim 8, wherein the distributing of the plurality of metaframes is performed in a lock-step mode in which each of the one or more rendering nodes is in synch with a server.

13. The non-transitory computer-readable storage medium of claim 12, wherein external signals are sent to the server or the one or more rendering nodes to control execution of player loops within the server or the one or more rendering nodes.

14. The non-transitory computer-readable storage medium of claim 8, wherein a state of the scene graph is serialized into the plurality of metaframes at configurable intervals.

15. A method comprising:

loading data from digital objects within a three-dimensional (3D) environment;

determining motion for the digital objects, the determining of the motion including applying simulation or physics logic to the data;

generating a plurality of metaframes based on a plurality of scene graphs, each of the plurality of metaframes including the digital objects captured at a plurality of points in time, each of the plurality of metaframes including data describing position, scale, or rotation of the digital objects within the 3D environment at a point in time of the plurality of points of time;

organizing the plurality of metaframes into a queue of metaframes; and distributing the plurality of metaframes to one or more rendering nodes in response to dequeuing of the metaframes from the queue by the one or more rendering nodes.

16. The method of claim 15, wherein the generating is executed by a first process and each of the one or more rendering nodes is executed by an additional process and each of the one or more rendering nodes is configured to transmit a generated rendered image to an image consumer device or display the generated rendered image on a display device.

17. The method of claim 15, wherein the generating of the plurality of metaframes is performed in an asynchronous mode with respect to the one or more rendering nodes.

18. The method of claim 15, wherein the distributing of the plurality of metaframes is performed in a camera affinity node in which each node of the one or more rendering nodes is associated with a camera and the dequeuing of each metaframe by each of the one or more rendering nodes is based on camera affinity data included in the metaframe.

19. The method of claim 15, wherein the distributing of the plurality of metaframes is performed in a lock-step mode in which each of the one or more rendering nodes is in synch with a server.

20. The method of claim 19, wherein external signals are sent to the server or the one or more rendering nodes to control execution of player loops within the server or the one or more rendering nodes.

* * * * *